United States Patent
Schroeer

(10) Patent No.: US 12,385,424 B2
(45) Date of Patent: Aug. 12, 2025

(54) INTERNAL COMBUSTION ENGINE FOR A MOTOR VEHICLE, IN PARTICULAR FOR A CAR

(71) Applicant: Mercedes-Benz Group AG, Stuttgart (DE)

(72) Inventor: Dietmar Schroeer, Weissach im Tal (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/724,847

(22) PCT Filed: Jan. 25, 2023

(86) PCT No.: PCT/EP2023/051814
§ 371 (c)(1),
(2) Date: Jun. 27, 2024

(87) PCT Pub. No.: WO2023/148065
PCT Pub. Date: Aug. 10, 2023

(65) Prior Publication Data
US 2025/0059902 A1   Feb. 20, 2025

(30) Foreign Application Priority Data
Feb. 3, 2022   (DE) .................. 10 2022 000 415

(51) Int. Cl.
*F01N 3/22* (2006.01)
*F16K 15/00* (2006.01)
(Continued)

(52) U.S. Cl.
CPC ............... *F01N 3/22* (2013.01); *F16K 15/00* (2013.01); *F15D 1/025* (2013.01); *F16K 13/00* (2013.01); *F16L 55/02754* (2013.01)

(58) Field of Classification Search
CPC .. F01N 3/22; F01N 2550/14; F16L 55/02754; F15D 1/025; F16K 15/00; F16K 13/00
See application file for complete search history.

(56) References Cited

U.S. PATENT DOCUMENTS

| | | |
|---|---|---|
| 1,329,559 A | 2/1920 | Tesla |
| 4,224,792 A | 9/1980 | Hayashi et al. |
| | | (Continued) |

FOREIGN PATENT DOCUMENTS

| | | |
|---|---|---|
| DE | 330151 C | 12/1920 |
| DE | 10 2018 107 436 A1 | 5/2018 |
| | (Continued) | |

OTHER PUBLICATIONS

English translation of DE 102019217473 A1 provided by Clarivate Analytics.*

(Continued)

*Primary Examiner* — Ngoc T Nguyen
(74) *Attorney, Agent, or Firm* — Crowell & Moring LLP

(57) ABSTRACT

An internal combustion engine with an exhaust tract and with a secondary air system which has a secondary air conduit through which secondary air can flow in an injection direction. The secondary air can be introduced into the exhaust tract. A valve element is arranged in the secondary air conduit and has a first flow resistance along the injection direction and a greater second flow resistance along an opposite backflow direction, as a result of which a backflow taking place in the backflow direction can be limited. The valve element has a plurality of rotationally symmetrical impact bodies which are arranged consecutively along the injection direction and are connected to one another. The valve element is arranged in a length region of the secondary (Continued)

air conduit which is limited by a structural element of the internal combustion engine which is formed separately from the valve element.

8 Claims, 5 Drawing Sheets

(51) Int. Cl.
*F15D 1/02* (2006.01)
*F16K 13/00* (2006.01)
*F16L 55/027* (2006.01)

(56) References Cited

U.S. PATENT DOCUMENTS

| | | | |
|---|---|---|---|
| 10,245,586 B2* | 4/2019 | Gilbert | F16K 13/00 |
| 2019/0101230 A1 | 4/2019 | Dalmas, II et al. | |

FOREIGN PATENT DOCUMENTS

| | | |
|---|---|---|
| DE | 10 2018 106 679 A1 | 9/2019 |
| DE | 10 2019 217 473 A1 | 5/2021 |
| JP | 60-32516 U | 3/1985 |

OTHER PUBLICATIONS

International Search Report (PCT/ISA/210) issued in PCT Application No. PCT/EP2023/051814 dated Mar. 31, 2023 (2 pages).
German-language German Office Action issued in German Application No. 10 2022 000 415.1 dated Aug. 3, 2022 (6 pages).
German-language German Office Action issued in German Application No. 10 2022 000 415.1 dated Sep. 27, 2024 (5 pages).

* cited by examiner

INTERNAL COMBUSTION ENGINE FOR A MOTOR VEHICLE, IN PARTICULAR FOR A CAR

BACKGROUND AND SUMMARY OF THE INVENTION

The invention relates to an internal combustion engine for a motor vehicle, in particular for a car.

DE 10 2019 217 473 A1 discloses a combustion engine comprising a primary air system for providing fresh air. A secondary air system is also provided which is designed to divert secondary air from the primary air system and to inject the air into an exhaust gas duct. A conduit is known from US. Pat. No. 1,329,559. Furthermore, DE 10 2018 107 436 A1 discloses an internal combustion engine comprising an exhaust gas recirculation device and a return valve for controlling the amount of exhaust gas to be recirculated to the fresh air line. In addition, a method for operating a combustion engine is known from DE 10 2018 106 679 A1. Furthermore, an internal combustion engine comprising a secondary air system is known from JP S60 32516 U. An internal combustion engine comprising a secondary air injection system is also known from U.S. Pat. No. 4,224,792 A. In addition, a device for controlling the movement of matter is known from US 2019/101230 A1.

The object of the present invention is to provide an internal combustion engine for a motor vehicle, so that secondary air injection can be realized in a particularly advantageous way.

The invention relates to an internal combustion engine, also referred to as engine or combustion engine and designed for example as a reciprocating piston engine, for a motor vehicle, in particular for a car and most particularly for a passenger car. This means that when the motor vehicle is fully assembled, the internal combustion engine has the internal combustion engine and can be driven thereby. The internal combustion engine has an exhaust tract through which exhaust gas from the internal combustion engine can flow. By way of example, when the internal combustion engine is firing, combustion processes take place in the internal combustion engine, in particular in combustion chambers of the internal combustion engine. During the respective combustion process, a fuel-air mixture, also referred to simply as a mixture, is burnt, resulting in the exhaust gas. The exhaust gas can flow out of the respective combustion chamber and into and through the exhaust tract. The internal combustion engine has also a secondary air system by means of which, as will be explained in more detail below, a secondary air injection can be carried out. The secondary air system has a secondary air conduit through which air as secondary air can flow in an injection direction, as a result of which the secondary air flowing through the secondary air conduit in the injection direction can be introduced into the exhaust tract. In other words, the secondary air injection involves the secondary air flowing through the secondary air conduit in the injection direction and thus being introduced into the exhaust tract by means of the secondary air conduit, this process also being referred to as injection of the secondary air. Thus, the secondary air flowing through the secondary air conduit in the injection direction flows in the direction of the exhaust tract or towards the exhaust tract. In particular, the secondary air is introduced, i.e., injected, into the exhaust tract by means of the secondary air conduit, bypassing the or preferably all combustion chambers of the internal combustion engine. This means that the secondary air enters the exhaust tract not via one of the combustion chambers for instance, but rather that the secondary air does not flow through the combustion chambers of the internal combustion engine on its way through the secondary air conduit into the exhaust tract, meaning that the secondary air bypasses the or all combustion chambers of the internal combustion engine. Expressed in other words, the secondary air is introduced, i.e., injected, directly into the exhaust tract by means of the secondary air conduit. In particular, the secondary air flowing through the secondary air conduit in the injection direction can be introduced in the exhaust tract, in particular directly, by means of the secondary air conduit at least one or exactly one introduction point. In this case, the introduction point is located in particular downstream of the or all combustion chambers of the internal combustion engine, and for example is the introduction point is located in a cylinder head the internal combustion engine.

At least one exhaust gas aftertreatment element for aftertreating the exhaust gas is arranged in the exhaust tract for example, in particular downstream of the introduction point. The exhaust gas aftertreatment element is or comprises, for example, a catalytic converter. The secondary air brought, i.e., introduced, into the exhaust tract is used in particular to heat the exhaust gas aftertreatment element, i.e., to warm it up. For example, a fuel, i.e., unburnt hydrocarbons, in the exhaust tract can react with oxygen from the secondary air, as a result of which the fuel is burnt, in particular with release of heat. The released heat can be used to heat the exhaust gas aftertreatment element effectively and particularly quickly.

The secondary air comes, for example, from an intake tract, also referred to as inlet tract, of the internal combustion engine. Air, also referred to as fresh air, can flow through the intake tract. The fresh air is guided to and into the combustion chambers by means of the intake tract. For example, in particular by means of the secondary air conduit, at least a part of the fresh air flowing through the intake tract can be diverted from the intake tract and introduced into the secondary air conduit. The part of the fresh air introduced into the secondary air can flow through the secondary air conduit as the aforementioned secondary air and is then introduced into the exhaust tract, in particular directly, by means of the secondary air conduit. In particular, can the secondary air system can have an air pump, also referred to simply as a pump, by means of which the secondary air can be conveyed through the secondary air conduit.

The secondary air system also has at least one valve element arranged in the secondary air conduit and thus through which the secondary air can flow, in particular the injection direction, which valve element has a first flow resistance along the injection direction, in particular for a gas such as the secondary air, a first flow resistance. Along a backflow direction in the opposite direction to the injection direction, the valve element has a second flow resistance, in particular for the gas, which is, in particular significantly, greater than the first flow resistance. As a result, the valve element can at least limit, in particular prevent, a backflow, in particular of the gas, taking place in the backflow direction. The valve element is thus a backflow limiter or a backflow preventer, since the valve element prevents an in particular undesired backflow, for example of the gas, through or in the secondary air conduit.

As mentioned above, the gas mentioned can be the secondary air. Thus, for example, the valve element provides the first flow resistance for the secondary air as viewed along the injection direction and the second flow resistance as viewed along the backflow direction. Furthermore, the gas can be the exhaust gas. In other words, assuming that the exhaust gas were to be guided or to flow in the injection direction through the secondary air conduit, the valve element would have or provide the first flow resistance for the exhaust gas flowing through the secondary air conduit in the injection direction. Along the backflow direction, however, the valve element has the second flow resistance that is greater than the first flow resistance. This secondary air and the exhaust gas are to be regarded as very similar or identical in terms of their flow behaviour and in particular with respect to the flow resistances of the valve element, so that on the one hand, the valve element allows the secondary air to flow through the secondary air conduit and thus the valve element in the injection direction and thus to be brought, in particular directly, into the exhaust tract. On the other hand, the valve element prevents or stops an excessive flow of the exhaust gas through the valve element and thus through the secondary air conduit in the backflow direction in the opposite direction to the injection direction. Thus, the valve element prevents an excessive amount of the exhaust gas from flowing from the exhaust tract into the secondary air conduit and/or excessive penetration of the exhaust gases from the exhaust tract into the secondary air conduit. By way of example, for this purpose the valve element is designed such that if the gas, such as the secondary air and the exhaust gas, flows or were to flow in the injection direction through the valve element, the valve element generates a first pressure drop of the gas or its flow. Furthermore, the valve element is designed, for example, so that if the gas, such as the secondary air or the exhaust gas, flows or were to flow in the backflow direction through the valve element or is or were to be guided through the valve element, in particular actively and thus for example by force, the valve element generates a second pressure drop of the gas or its flow, with the second pressure drop being greater, in particular significantly greater, than the first pressure drop. As a result, excessive inflow or backflow of the exhaust gas into or in the secondary air conduit can be avoided.

In order to now introduce, i.e., bring or inject, the secondary air into the exhaust tract in a particularly advantageous manner by means of the secondary air conduit and thus via the valve element, it is provided according to the invention that the valve element has a plurality of impact bodies which are arranged consecutively and thus one after another along or in the injection direction, whereby the respective impact body itself, i.e., considered on its own, is rotationally symmetrical. On its way through the secondary air conduit and in the process through the valve element to the exhaust tract, the secondary air thus initially flows onto and around a first one of the impact bodies, whereupon the secondary air a second flows onto and around a second one of the impact bodies. The second impact body is arranged downstream of the first impact body as viewed in the injection direction, i.e., along the injection direction. The impact bodies are connected to one another, as a result of which the impact bodies form an assembly in itself, i.e., considered on its own, which in its assembled state can thus be handled as a whole unit, for example by a person or a robot, and can thus for example be mounted, i.e., installed. In particular, the assembly can be the valve element.

The valve element and thus the assembly are arranged in a length region of the secondary air conduit, wherein the length region is limited by a structural element of the internal combustion engine, which structural element is formed separately from the valve element and thus separately from assembly. The invention makes if possible, for example during manufacture of the internal combustion engine, to handle the assembly and thus the plurality of impact bodies and/or a group and/or of impact bodies at the same time and thus for example to move and install them relative to the structural element, for example by moving the assembly into the length region and thus arranging it in the length region.

In principle, it is conceivable for the impact bodies to be separate bodies that are connected to one another. However, it has been shown to be particularly advantageous if the impact bodies are formed in one piece with one another. This means that the impact bodies are integral constituent parts of a one-piece body, i.e., a body manufactured integrally in one piece, whereby the body is not composed of a plurality of separately formed components, but the body is designed as a monobloc through which the impact bodies are formed.

It is additionally preferably provided that the valve element is designed as a passive valve element without moving parts, as a result of which excessive, undesired backflow, in particular of the exhaust gas, in or into the secondary air conduit can be avoided.

In order to be able to bring, in particular to inject, the secondary air particularly advantageously into the exhaust tract, it can be provided in one advantageous embodiment of the invention that the structural element is the aforementioned cylinder head of the internal combustion engine. In this case, for example, the respective combustion chamber is partially delimited by a respective combustion chamber roof, with the respective combustion chamber roof being formed through the cylinder head.

The length region is preferably directly delimited by the structural element, in particular by an inner circumferential and thus in particular concave lateral surface of the structural element, whereby, for example, the valve element, in particular an outer circumferential and thus for example convex lateral surface of the valve element, directly touches the structural element, in particular the inner circumferential lateral surface.

A further embodiment is characterized in that at least one part of the structural element delimiting the length region, in particular directly, is formed in one piece. This is understood to mean in particular that at least the part of the structural element is manufactured integrally and thus as one piece and thus designed as a monobloc, so that the part of the structural element is not composed for instance from a plurality of separate components formed with one another. As a result, the secondary air can be introduced particularly easily and in particular particularly cost-effectively into the exhaust tract.

In order to be able to realize a particularly advantageous and in particular cost-effective and effective and efficient secondary air injection, it is provided in a further embodiment of the invention that at least the part of the structural element is produced by casting and is thus a cast component.

In a further, particularly advantageous embodiment of the invention, the respective impact body has a respective region that widens continuously along the injection direction, i.e., as viewed in the injection direction. This allows the first flow resistance be kept advantageously low. At the same time, the second flow resistance can be designed to be advantageously high. As a result, on the one hand the valve element can be designed to be particularly compact, so that the valve element and thus the secondary air conduit and also the introduction point can be positioned in a particularly advantageously manner. On the other hand, an undesired flow of the exhaust gas into and/or in the secondary air conduit can be avoided.

The valve element thus functions as a check valve or as a type of check valve, preferably without moving components, however. As a result, a particularly compact construction of the valve element can be realized, so that the valve element and consequently the secondary air conduit and very particularly the introduction point can be positioned in an advantageous manner. As a result, a particularly advantageous secondary air injection can be achieved.

In order to be able to realize the respective flow resistance in a particularly advantageous manner, it is provided in a further configuration of the invention that the respective region, which widens continuously along the injection direction, is conical or frustoconical.

The respective region which widens continuously along the injection direction is also referred to as a first region.

A further embodiment provides that a respective second region of the respective impact body follows the respective first region the respective impact body along the injection direction, i.e., as viewed in the injection direction. The respective second region of the respective impact body tapers continuously along the injection direction, i.e., in the injection direction. As a result, the flow resistances can be designed in a particularly advantageous manner, whereby simultaneously a particularly compact construction of the valve element can be achieved.

It has been shown to be particularly advantageous in this case if the respective second region is conical or frustoconical. This ensures, on the one hand, a particularly advantageous flow of the secondary air in the injection direction and thus towards the exhaust tract. On the other hand, undesired backflows of the exhaust gas into the secondary air conduit are advantageously avoided.

In order, on the one hand, to be able to guide the secondary air particularly well in the injection direction through the secondary air conduit, but on the other hand to avoid an excessive backflow of the exhaust gas, while simultaneously realising a compact construction of the valve element, it is provided in a further embodiment of the invention that the largest outer circumference, in particular the largest outside diameter, of the respective first region is greater than the largest or maximum outer circumference, in particular outside diameter, of the respective second region.

It is furthermore conceivable that the respective second region merges into the respective first region via a respective transition region, whereby preferably the respective transition region is curved in the backflow direction and thus counter to the injection direction. In particular, the transition region is an annular region which extends around the respective second region, in particular all the way around, in the circumferential direction, which extends around the injection direction, of the respective impact body. As a result, excessive backflows of exhaust gas into the secondary air conduit are advantageously avoided.

Finally, it has been shown to be particularly advantageous if a respective ring of the valve element is associated with the respective impact body, wherein the respective impact body engages in the ring associated with the respective impact body. These rings are connected to one another and to the impact bodies, so that preferably the rings are constituent parts of the assembly. It is conceivable that the rings are formed in one piece with one another, so that preferably the rings are integral constituent parts of an annular body. In particular, it is conceivable that the rings and thus the annular body are formed in one piece with the aforementioned body, therefore in one piece with the impact bodies. Thus both the rings and the impact bodies are preferably integral constituent parts of the aforementioned body, which is designed as a monobloc and is manufactured integrally and thus in one piece and is therefore not composed of a plurality of components that are designed separately from one another and connected to one another. This means that a particularly compact construction of the valve element can be realized, so that in particular the introduction point can be positioned in an advantageous manner. Consequently, a particularly advantageous secondary air injection can be realized.

By way of example, the internal combustion engine is an Otto engine. In particular, the internal combustion engine can be a turbocharged internal combustion engine. This is to be understood as meaning in particular that the internal combustion engine has at least one exhaust gas turbocharger which has a compressor arranged in the intake tract and a turbine arranged in the exhaust tract. The turbine can be driven by the exhaust gas, whereby the compressor can be driven by the turbine. By driving the compressor, the fresh air flowing through the intake tract can be compressed by means of the compressor.

The invention is based in particular on the following findings and considerations. The secondary air injection is used, in particular in an Otto engine turbocharged by an exhaust gas turbocharger, for example to bring a temperature of the exhaust gas aftertreatment element to an advantageous operating temperature particularly rapidly after a cold start of the internal combustion engine, in particular by post-reacting the exhaust gas or constituent parts contained in the exhaust gas, thus avoiding excessive emissions of undesired constituent parts. In particular constituent parts mentioned can be the fuel, i.e., unburnt hydrocarbons. For example, at least one respective outlet duct, which is arranged in particular in the mentioned cylinder head, is associated with the respective combustion chamber. In particular, the respective outlet duct is delimited, in particular directly, by the cylinder head. At least one or a plurality of outlet valves, which can move relative to the cylinder head, in particular translationally, are associated with the respective combustion chamber. The respective exhaust gas can flow out of the respective combustion chamber and into the respective outlet duct via the respective outlet valve. The outlet duct is also referred to as an exhaust gas duct.

It has been shown to be particularly effective if the secondary air is injected directly downstream of the respective outlet valve or downstream of the respective outlet valve into the respective exhaust gas duct, in particular in each individual exhaust gas duct. In particular, the respective exhaust gas duct or outlet duct is a constituent part of the exhaust tract. An operating strategy of the internal combustion engine can provide for the engine to run at high loads and thus high mean effective pressures at low speeds, even in an operating stage in which secondary air is injected into the exhaust tract inject, in order to enable operation with the lowest possible a fuel consumption as possible. In particular, the respective outlet duct is a constituent part of the exhaust tract. However, the problem can arise in this case that an exhaust backpressure and especially expulsion bursts of the exhaust gas can make it very difficult to inject sufficient secondary air into the respective exhaust gas duct and thus into the exhaust tract. If, for example, a pressure of the secondary air caused in particular by air pump, also referred to as secondary air pump, is not sufficient each exhaust gas burst results in such a large backflow of exhaust gas into the secondary air conduit and thus into a secondary air duct delimited by the secondary air conduit, in particular directly, that an averaged flow of the secondary air is no longer sufficient for a sufficient reaction in the exhaust tract and thus for sufficiently heating the exhaust gas aftertreatment element if no appropriate countermeasure is taken.

One possible solution to the problem is to provide the secondary air pump with a particularly high output, i.e., to use a particularly powerful secondary air pump. For example, the secondary air pump is an electric secondary air pump and can therefore be operated electrically. However, the disadvantage of this is that a power consumption of the secondary air pump is then very high, which leads to additional load on an electrical system of the motor vehicle. In addition, the secondary air conduit and a secondary air valve, which for example is arranged in the secondary air conduit and is designed to set an amount of secondary air to be introduced into the exhaust tract, must withstand a or the higher pressure of the secondary air, as a result of which the secondary air conduit and the secondary air valve require a lot of installation space and are weight-intensive and cost-intensive. In particular, the secondary air valve is arranged upstream of the valve element as viewed along the injection direction.

It has been found that check valves in secondary air or manifold conduits extending outside the cylinder head cannot sufficiently prevent exhaust gas from flowing back into injection ducts of the individual combustion chambers in particular. Due to the compressibility of the secondary air, even long ducts allow the undesired penetration of exhaust gas into the secondary air conduit. It is therefore an advantage to arrange a backflow preventer or limiter such as the valve element particularly close to the respective outlet valve or on the respective outlet valves. In particular, it is conceivable that the respective combustion chamber or each combustion chamber is associated with at least or exactly one respective introduction point at which the secondary air can be introduced into the exhaust tract. It is advantageous here in particular if the valve element, designed for example as a backflow preventer or backflow limiter, is arranged particularly close to the respective outlet valve. Thus it is advantageous to arrange the valve element in the cylinder head. However, the installation space in the cylinder head is typically very limited, so the valve element should be particularly compact. This can now by realized by the invention. The valve element of the internal combustion engine according to the invention thus represents a countermeasure to prevent excessive backflow of exhaust gas into or in the secondary air conduit. Since a particularly compact construction of the valve element can be realized by the invention, the valve element can be arranged particularly close to or downstream of the respective outlet valve and therefore in the cylinder head. In particular, a particularly large number of impact bodies can be realized, so that excessive backflow can be avoided particularly well.

Conventional ball check valves cannot be used to prevent or limit an undesired backflow into or in the secondary air conduit due to too great a mass inertia. Even reed valves or shutter valves and plate valves are not suitable for use in the secondary air conduit, since this could cause service life problems. They are also exposed to soiling by soot particles from the combustion if the exhaust gas gets, at least briefly, into the secondary air duct or into the secondary air conduit.

Compared to conventional solutions, the invention now enables, on the one hand, a particularly compact construction of the valve element, so that the valve element can be arranged particularly close to the respective outlet valve of the respective combustion chamber and in the process in particular in the cylinder head. In this way, on the one hand, an advantageous secondary air injection can be realized. On the other hand, excessive backflow of exhaust gas into and/or in the secondary air conduit can be avoided.

In particular, the valve element of the he internal combustion engine according to the invention can be designed as a Tesla valve or in the manner of a Tesla valve. In particular it is conceivable that the respective ring is rotationally symmetrical, in particular in relation to the same axis with respect to which the respective impact body is also rotationally symmetrical. Due to its compactness, the valve element of the internal combustion engine according to the invention can be used in a secondary air intake which is only slightly larger than conventional solutions, is designed, for example, as a borehole and is, for example, the aforementioned length region.

In particular due to the compactness of the valve element and the rotationally symmetrical design of the impact body, it is possible to arrange the valve element very close to the outlet duct or the outlet valve. A volume of the secondary air between the respective outlet valve and the outlet duct is therefore very small. Nevertheless, a high number of the impact bodies can be realized. By way of example, the respective impact body and the respective ring associated with the respective impact body form a ring/impact body pair, whereby there can be a particularly high number of ring/impact body pairs. This enables a particularly high barrier effect to be realized, so that excessive backflow of the exhaust gas into and/or in the secondary air conduit can be avoided. Therefore, only a small amount of the exhaust gas can enter the secondary air conduit during an exhaust gas burst and thus be lost to a burst discharge effect of the exhaust gas turbocharger or the turbine. In addition a large mass flow of the secondary air can be injected into the exhaust tract easily and without a complicated, costly and weight-intensive secondary air pump. A heating effect for heating the exhaust gas aftertreatment element is improved thereby compared to conventional solutions, and the time required to achieve an appreciable conversion rate of the exhaust gas aftertreatment element can be shortened. As a result, a particularly low-emissions operation of the internal combustion engine can be realized. In addition, hardly any exhaust gas penetrates into the secondary air conduit, thereby preventing excessive soiling and soot deposits in the secondary air conduit which could clog up the cross sections of the secondary air conduit could over a relatively long period of operation.

The secondary air system preferably has the aforementioned secondary air valve, by means of which, for example, the secondary air conduit can be switched off, in particular completely, i.e., fluidically blocked. In particular, the secondary air valve makes it possible to switch off the secondary air injection in particular by fluidically blocking the secondary air conduit, in particular completely, by means of the secondary air valve, since the secondary air injection is not required during in large parts of the operation of the internal combustion engine. By fluidically blocking the secondary air conduit by means of the secondary air valve, in particular completely, in particular at high loads the exhaust gas can be prevented from flowing back and thus escaping via the secondary air system. In particular, the secondary air valve is a switch valve. As viewed along the injection direction, the secondary air valve is arranged upstream of the valve element and therefore in particular in the secondary air conduit. Since the valve element of the internal combustion engine according to the invention has a particularly advantageous barrier effect, therefore preventing excessive backflow of exhaust gas into and in the secondary air conduit, the secondary air valve can be protected by means of the valve element particularly advantageously against soiling and thus against faults and premature failure.

Further advantages, features and details of the invention will emerge from the following description of a preferred exemplary embodiment and with reference to the drawings. The features and feature combinations mentioned above in the description and the features and feature combinations mentioned hereinbelow in the description of the figures and/or shown alone in the figures can be used not only in the respectively given combination, but also in other combinations or in isolation, without the departing from the scope of the invention.

DETAILED DESCRIPTION OF THE DRAWINGS

In the figures, similar or functionally similar elements are provided with the same reference signs.

Figure 1:
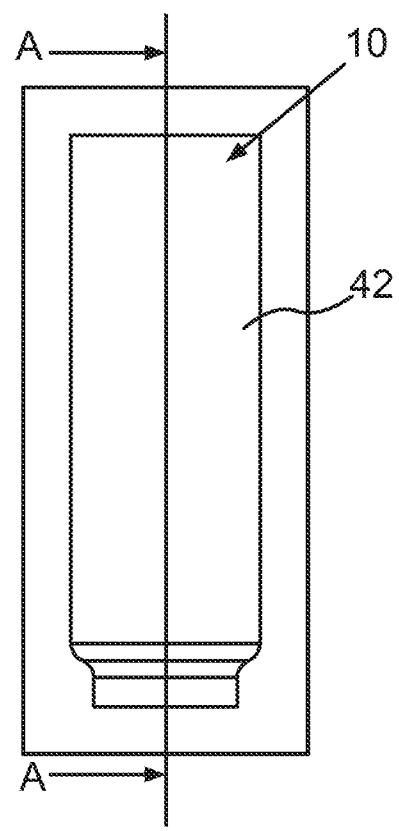
FIG. 1 is a schematic side view of a valve element of a secondary air system for an internal combustion engine of a motor vehicle.

FIG. 1 shows in a schematic side view a valve element 10 of a secondary air system of an internal combustion engine for a motor vehicle. The internal combustion engine is shown in schematic sectional cutaway view in FIGS. 5 and 6 and is designated with 12. The internal combustion engine 12 has an exhaust tract, through which exhaust gas from the internal combustion engine 12 can flow, and the secondary air system. In particular, the internal combustion engine 12 has a plurality of combustion chambers. The respective combustion chamber is for example partly delimited by a respective cylinder of the internal combustion engine 12. By way of example, the respective cylinder is delimited by a crankcase of the internal combustion engine 12. The crankcase is, for example, a cylinder housing, in particular a cylinder crankcase. The internal combustion engine 12 is in the form of a reciprocating piston engine. A respective piston is received in the respective cylinder so that it can move translationally, meaning that the respective combustion chamber is partly delimited by the respective cylinder and partly by the respective piston received in the respective cylinder so that it can move translationally. In addition, the respective combustion chamber is partly delimited by a respective combustion chamber roof. The respective combustion chamber roof is formed by a cylinder head 14 of the internal combustion engine 12. The cylinder head 14 is formed separately from the crankcase and is connected to the crankcase. It can be discerned from FIG. 5 that at least one outlet valve 16 and at least one outlet duct 18 are associated with the respective combustion chamber. In particular, at least or exactly two outlet valves 16 are associated with the respective combustion chamber. When the internal combustion engine 12 is firing, combustion processes take place in the respective combustion chamber. During the respective combustion process, a fuel-air mixture, also referred to simply as a mixture, is burnt. This results in the aforementioned exhaust gas. The exhaust gas can flow out of the respective combustion chamber and flow via the respective outlet valve 16 associated with the respective combustion chamber into the respective outlet duct 18 associated with the respective combustion chamber and then flow through the respective outlet duct 18, which is also referred to as an exhaust gas duct or exhaust gas conduit. The respective outlet duct 18 is a constituent part of the mentioned exhaust tract of the internal combustion engine 12, the exhaust tract of which is designated with 20. It is discernible that the respective outlet duct 18 is arranged in the cylinder head 14. In this case, the respective outlet duct 18 is formed, in particular directly, by the cylinder head 14, i.e., it is delimited.

Figure 5:
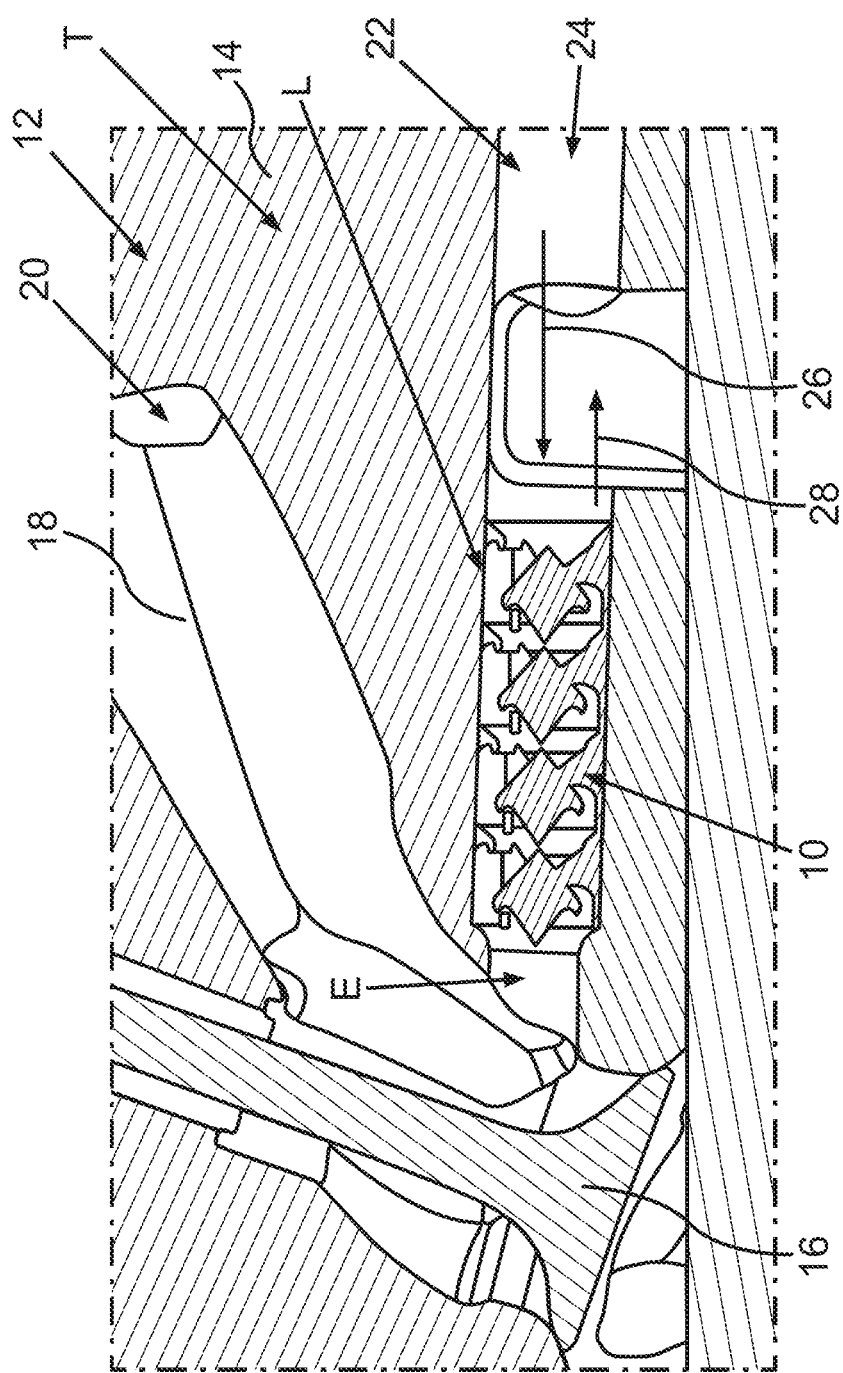
FIG. 5 is a schematic sectional cutaway view of the internal combustion engine equipped with the secondary air system and the valve element.
Figure 6:
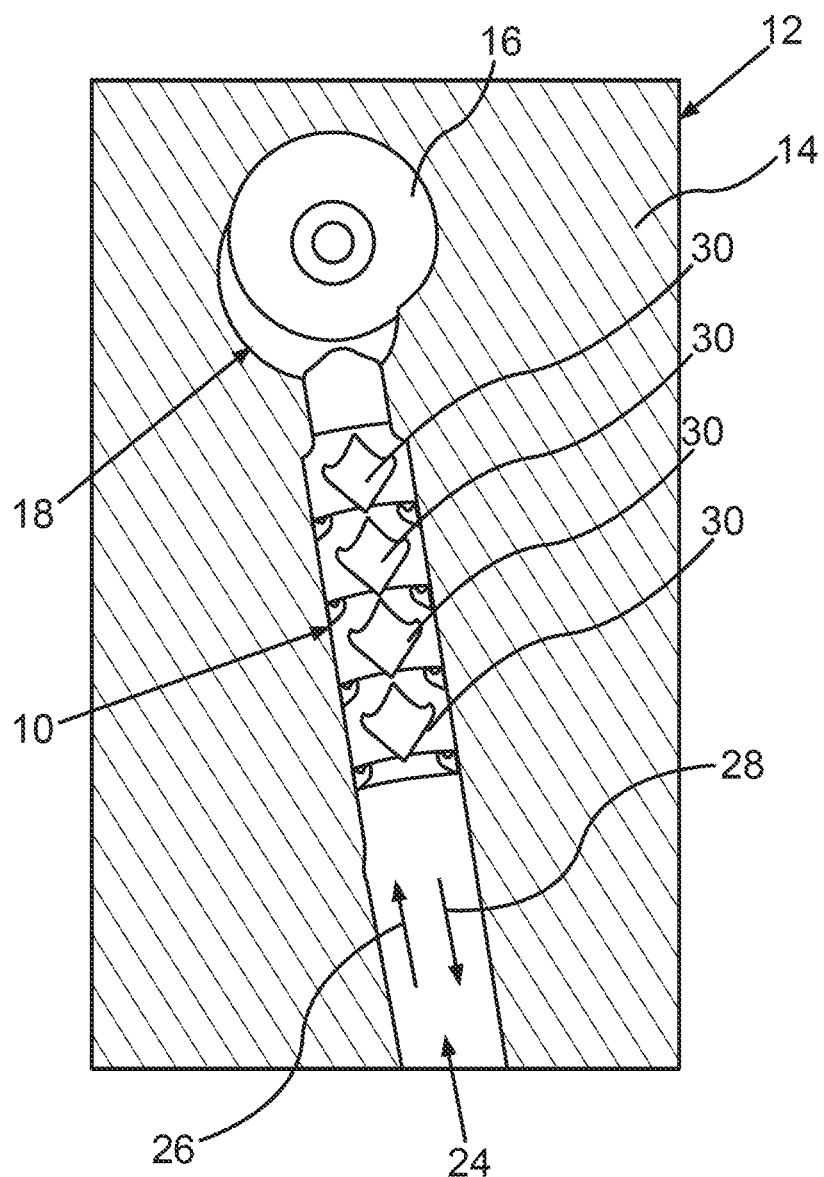
FIG. 6 is a further schematic sectional cutaway view of the internal combustion engine.

The secondary air system of the internal combustion engine 12, which can be seen in a cutaway view in FIGS. 5 and 6 and is designated therein with 22, has, in particular for each combustion chamber, at least or exactly one secondary air conduit 24, through which air can flow as secondary air in an injection direction illustrated in FIG. 5 by an arrow 26. In this way, the secondary air flowing through the secondary air conduit 24 in the injection direction (arrow 26) can be introduced into the outlet duct 18 and thus into the exhaust tract 20. At least a first exhaust gas aftertreatment element for aftertreating the exhaust gas is arranged in the exhaust tract 20 downstream of the outlet duct 18. By way of example, the exhaust gas aftertreatment element comprises a catalytic converter. The secondary air can be used to heat up the catalytic converter particularly rapidly and thus bring it to its operating temperature. The introduction of the secondary air into the exhaust tract 20 is also referred to as injection of the secondary air or as secondary air injection. It can be discerned from FIG. 5 that the secondary air flowing through the secondary air conduit 24 in the injection direction can flow out of the secondary air conduit 24 at an introduction point E and flow into the outlet duct 18 and thus into the exhaust tract 20. In particular, the secondary air conduit 24 opens at the introduction point E into the outlet duct 18 and thus into the exhaust tract 20. A backflow direction in the opposite direction to the injection direction is illustrated in FIG. 5 by an arrow 28.

The secondary air system 22 also has, in particular for each secondary air conduit 24, a valve arranged in the secondary air conduit 24, which is the valve element 10 shown in FIG. 1. The valve element 10 has a first flow resistance along the injection direction, in particular for a gas flowing through the secondary air conduit 24 in the injection direction. Along the backflow direction in the opposite direction to the injection direction, the valve element 10 has, in particular for the gas flowing through the secondary air conduit 24 in the backflow direction, a second flow resistance, which is greater, in particular significantly greater, than the first flow resistance. The gas can be understood, for example, as both the secondary air and the exhaust gas. If, for example, the secondary air now flows in the injection direction through the secondary air conduit 24 and thus through the valve element 10, the valve element 10 has the first flow resistance for the secondary air. Were, for example, the secondary air to flow in the backflow direction through the secondary air conduit 24 and thus through the valve element 10 or, in particular be actively conveyed therethrough, the valve element 10 would then have the second flow resistance for the secondary air flowing through the secondary air conduit 24 in the backflow direction. In other words, if the gas, such as the secondary air or the exhaust gas, flows or were to flow in the injection direction through the secondary air conduit 24 and thus through the valve element 10, the valve element 10 causes a first pressure drop of the gas. By way of example, if the gas such as the secondary air or the exhaust gas flows or were to flow in the backflow direction through the secondary air conduit 24 and thus through the valve element 10, the valve element 10 then causes a second pressure drop of the gas, with the second pressure drop being greater than the first pressure drop. The valve element 10 is thus a backflow preventer or backflow limiter, since by means of the valve element 10, a flow of the exhaust gas, taking place in the backflow direction and also referred to as backflow, into and/or in the secondary air conduit 24 can be at least limited or prevented. Expressed in other words, the valve element 10 prevents excessive backflow of the exhaust gas out of the exhaust tract 20 into the and/or in the secondary air conduit 24, so that the valve element 10 for example can be used to avoid an excessive amount of the exhaust gas from the exhaust tract 20 penetrating into a conduit region of the secondary air conduit 24, the conduit region of which is arranged upstream of the valve element 10 as viewed along the injection direction.

Figure 2:
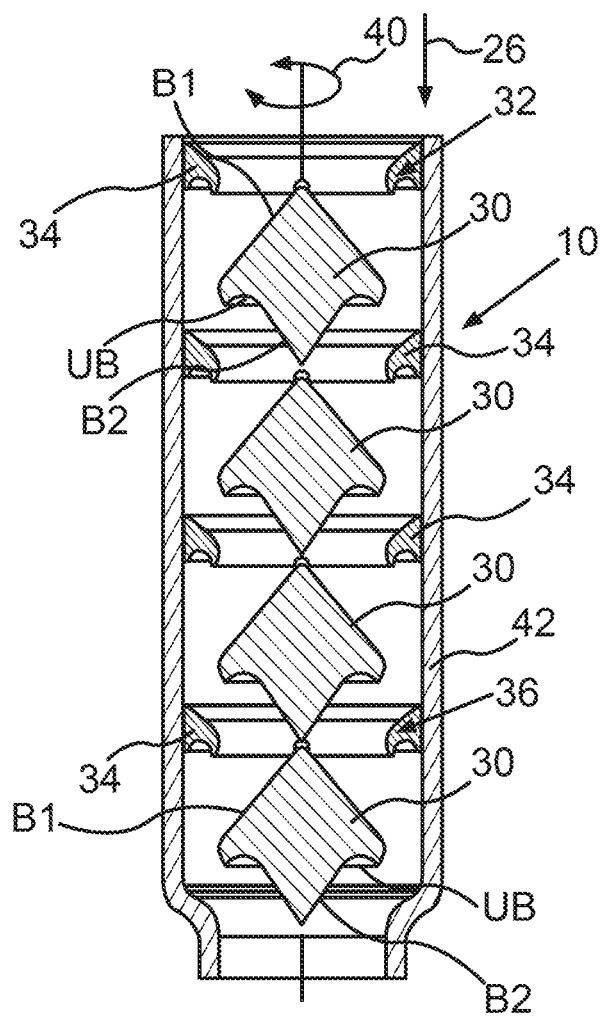
FIG. 2 is a schematic longitudinal sectional view of the valve element along a section line designated with A-A in FIG. 1.

In order to be able to carry out the secondary air injection in a particularly advantageous manner, the valve element 10 has a plurality of impact bodies 30 consecutively arranged along the injection direction, as can be seen particularly well by looking at FIG. 2 together with FIG. 6. The respective impact body 30 itself is rotationally symmetrical. The impact bodies 30 are connected to one another, in particular in such a way that the impact bodies 30 are formed in one piece with one another. The inter-connected impact bodies formed in particular in one piece with one another thus form an assembled assembly 32, which, for example, can be the valve element 10 or can be a constituent part of the valve element 10.

It can be discerned particularly well from FIG. 5 that the valve element 10 is arranged in a length region L of the secondary air conduit 24, the length region L of which is delimited by a structural element of the internal combustion engine 12 formed separately from the valve element 10, with the structural element in the exemplary embodiment shown in the figures being the cylinder head 14. This means that the length region L and thus the valve element 10 are arranged in the cylinder head 14, i.e., inside the cylinder head 14. A particularly compact construction of the valve element 10 can be realized, meaning that the valve element 10 can be arranged in the cylinder head 14. In addition this allows the valve element 10 and thus the introduction point E to be arranged particularly close to the respective outlet valve 16 and in the process, in particular, downstream of the outlet valves 16, thereby achieving a particularly efficient and effective secondary air injection.

Figure 4:
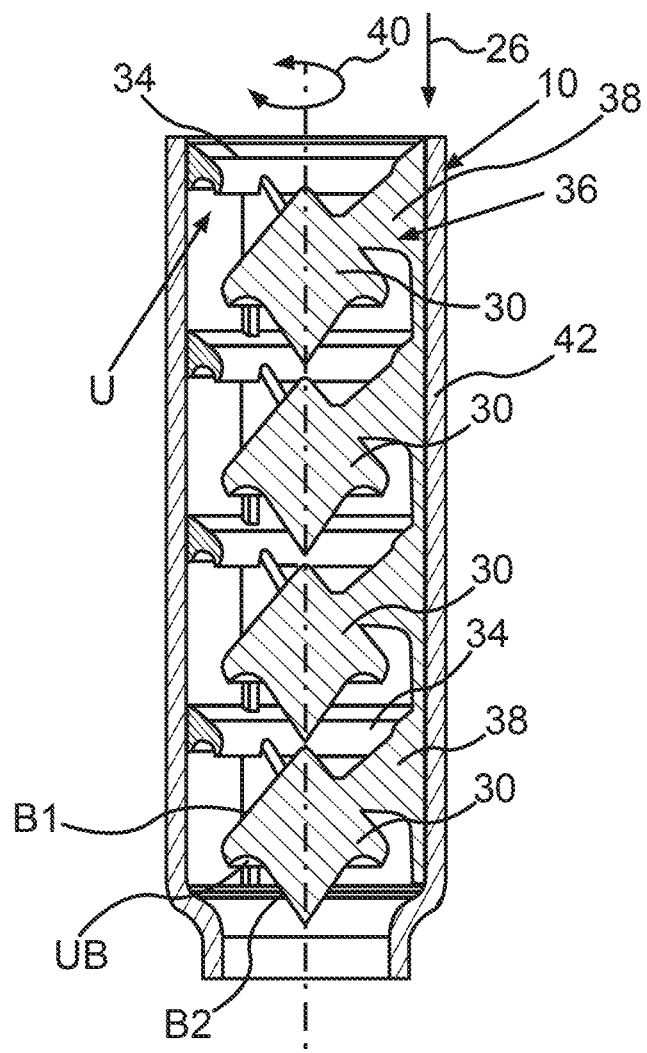
FIG. 4 is a schematic longitudinal sectional view of the valve element along a section line designated with B-B in FIG. 3.

It can be discerned particularly well from FIGS. 2 and 4 that the respective impact body 30, has a, in particular exactly one, respective ring 34 associated with it. It can be discerned particularly well from FIG. 4 that the rings 34 are connected to one another and to the impact bodies 30 in particular because the rings 34 are formed in one piece with one another and are formed in one piece with the impact bodies 30. The rings 34 and the impact bodies 30 form thus a one-piece and thus monobloc body 36, which can be the assembly 32. In other words, the body 36 is manufactured integrally and thus in one piece and is not for instance composed of a plurality of components that are formed separately from one another and thus connected to one another. In this case, both the rings 34 and the impact bodies 30 are integral constituent parts of the one-piece and thus monobloc body 36. In addition it is discernible from FIGS. 2 and 4 that the respective impact body 30 engages in the respective ring 34 associated with the respective impact body 30. In the present case, the impact bodies 30 are connected to the rings 34 and to one another via respective webs 38, which are formed in one piece with rings 34 and in one piece with the impact bodies 30 and are thus likewise constituent parts of the body 36. By way of example, at least two, in particular at least or exactly three, webs 38 associated with the respective impact body 30 are provided for each impact body 30. It can be provided in particular that the respective webs 38 associated with the respective impact body 30 are arranged evenly distributed in the circumferential direction, which extends around the injection direction, of the respective impact body 30 and are thus spaced apart from each other by 120° in pairs. Overall, it is discernible that the impact body 30 and the rings 34 are combined by means of the webs 38 to form the assembly 32, also referred to as a valve unit, in particular to form the body 36. The assembly 32 or the valve element 10 as a whole can be inserted particularly easily into the length region L, designed for example as a borehole, of the secondary air conduit 24 and secured there for example.

Figure 3:
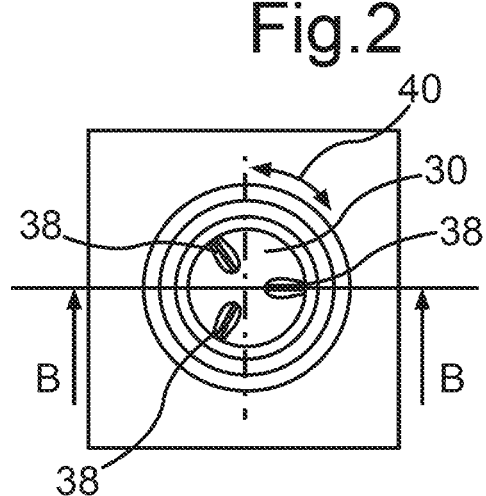
FIG. 3 is a schematic plan view of the valve element.

It can be discerned particularly well from FIG. 6 that the valve element 10 can be arranged particularly close to the outlet duct 18. This can particularly advantageously avoid an excess amount of the exhaust gas from the exhaust tract 20 entering the secondary air conduit 24. It can be discerned particularly well from FIG. 3 that the respective webs 38 associated with the respective impact body 30 are arranged evenly distributed in the circumferential direction of the respective impact body 30, with the circumferential direction being illustrated in FIG. 3 by a double arrow 40.

The valve element 10 can have a sleeve 42 have, in which for example the body 36 can be arranged. In particular, the sleeve 42 can be formed separately from the body 36 and be connected to the body 36, so that the sleeve 42 can be a constituent part of the assembly 32. The sleeve 42 could be dispensed with, however.

In the exemplary embodiment shown in the figures, at least a part T of the cylinder head 14 delimiting the length region L, in particular directly, is formed in one piece and manufactured, for example, by casting. In particular, it is conceivable that the cylinder head 14 as a whole is formed in one piece and is manufactured, for example, by casting.

As can be discerned particularly well from FIGS. 2 and 4, the respective impact body 30 has a respective first region B1 which widens continuously along the injection direction and is conical or frustoconical. Along the injection direction, the respective first region B1 of the respective impact body 30 follows a respective second region B2 of the respective impact body 30. The respective second region B2 of the respective impact body 30 tapers continuously along the injection direction, with the respective second region B2 being conical or frustoconical. In addition, the largest outer circumference, in particular outside diameter, of the respective first region B1 of the respective impact body 30 is greater than the largest outer circumference, in particular outside diameter, of the respective second region B2 of the respective impact body 30. The respective second region B2 merges into the respective, first region B1 via a respective transition region UB of the respective impact body 30 or vice versa. In this case, for example, the respective transition region UB is curved along the backflow direction, whereby for example the respective transition region UB extends completely around the respective second region B2 in the circumferential direction, which extends around the backflow direction or injection direction, of the respective impact body 30. The respective ring 34 is curved on a respective underside U facing the respectively associated impact bodies 30 in the injection direction, namely curved along the backflow direction and thus counter to the injection direction.

The invention claimed is:

1. An internal combustion engine (12) of a motor vehicle, comprising:
    an exhaust tract (20) through which exhaust gas from the internal combustion engine (12) is flowable; and
    a secondary air system (22) which has:
        a secondary air conduit (24) through which air as secondary air is flowable in an injection direction (26), wherein the secondary air is introducible into the exhaust tract (20); and
        a valve element (10) disposed in the secondary air conduit (24) which has a first flow resistance along the injection direction (26) and a second flow resistance that is greater than the first flow resistance along a backflow direction (28) in an opposite direction to the injection direction (26) such that a backflow in the backflow direction (28) is limitable;
    wherein the valve element (10) has a plurality of rotationally symmetrical impact bodies (30) which are disposed consecutively along the injection direction (26) and are connected to one another to form an assembly (32), wherein the valve element (10) and thus the assembly (32) is disposed in a length region (L) of the secondary air conduit (24), wherein the length region (L) is limited by a structural element (14) of the internal combustion engine (12), and wherein the structural element is formed separately from the valve element (10) and separately from the assembly (32);
    wherein each of the plurality of rotationally symmetrical impact bodies (30) has a respective region (B1) that widens continuously along the injection direction (26);
    wherein a respective second region (B2) of each of the plurality of rotationally symmetrical impact bodies (30) follows the respective region (B1) along the injection direction (26) and wherein the respective second region (B2) tapers continuously along the injection direction (26).

2. The internal combustion engine (12) according to claim 1, wherein the structural element (14) is a cylinder head (14) of the internal combustion engine (12).

3. The internal combustion engine (12) according to claim 1, wherein at least one part (T) of the structural element (14) that limits the length region (L) is formed as one piece.

4. The internal combustion engine (12) according to claim 3, wherein the at least one part (T) of the structural element (14) is produced by casting.

5. The internal combustion engine (12) according to claim 1, wherein the respective region (B1) is conical or frustoconical.

6. The internal combustion engine (12) according to claim 1, wherein the respective second region (B2) is conical or frustoconical.

7. The internal combustion engine (12) according to claim 1, wherein a largest outer circumference of the respective first region (B1) is greater than a largest outer circumference of the respective second region (B2).

8. An internal combustion engine (12) of a motor vehicle, comprising:
    an exhaust tract (20) through which exhaust gas from the internal combustion engine (12) is flowable; and
    a secondary air system (22) which has:
        a secondary air conduit (24) through which air as secondary air is flowable in an injection direction (26), wherein the secondary air is introducible into the exhaust tract (20); and
        a valve element (10) disposed in the secondary air conduit (24) which has a first flow resistance along the injection direction (26) and a second flow resistance that is greater than the first flow resistance along a backflow direction (28) in an opposite direction to the injection direction (26) such that a backflow in the backflow direction (28) is limitable;
    wherein the valve element (10) has a plurality of rotationally symmetrical impact bodies (30) which are disposed consecutively along the injection direction (26) and are connected to one another to form an assembly (32), wherein the valve element (10) and thus the assembly (32) is disposed in a length region (L) of the secondary air conduit (24), wherein the length region (L) is limited by a structural element (14) of the internal combustion engine (12), and wherein the structural element is formed separately from the valve element (10) and separately from the assembly (32);
    wherein a respective ring (34) of the valve element (10) is associated with a respective rotationally symmetrical impact body (30) of the plurality of rotationally symmetrical impact bodies (30), wherein the respective rotationally symmetrical impact body (30) engages in the respective ring (34) associated with the respective rotationally symmetrical impact body (30), and wherein the respective rings (34) are connected to one another and to the plurality of rotationally symmetrical impact bodies (30).

* * * * *